United States Patent [19]

Trageser

[11] 4,372,079
[45] Feb. 8, 1983

[54] GARDEN EDGING STRUCTURE

[76] Inventor: Ann S. Trageser, 114 Belvedere Sound View Dr., Hampstead, N.C. 28443

[21] Appl. No.: 227,184

[22] Filed: Jan. 22, 1981

[51] Int. Cl.³ .............................................. A01G 1/00
[52] U.S. Cl. ...................................................... 47/33
[58] Field of Search ...................... 47/32, 33, 25, 48.5; 404/7; 52/102

[56] References Cited

U.S. PATENT DOCUMENTS

| 2,184,904 | 12/1939 | Boehme | 47/33 |
| 3,345,774 | 10/1967 | Delbuguet | 47/48.5 |
| 3,495,352 | 2/1970 | Sbare | 47/33 |
| 3,788,001 | 1/1974 | Balfanz | 47/33 |
| 3,803,760 | 4/1976 | Matvey | 47/33 |

FOREIGN PATENT DOCUMENTS 2336535 2/1975 Fed. Rep. of Germany .......... 47/33

*Primary Examiner*—James R. Feyrer
*Attorney, Agent, or Firm*—Mills & Coats

[57] ABSTRACT

The present invention entails a garden edging structure that surrounds a garden plot and separates the same from grass, vegetation, or soil that might lie outwardly of the garden plot. Specifically, the garden edging structure includes an inner continuous boundary or border that surrounds the garden plot and includes a lower ground engaging portion that anchors the same about the plot, and an aboveground portion that tends to confine soil of the garden plot inwardly of the inner boundary. In addition, an outer boundary or border structure is provided and communicatively associated with said inner boundary structure. More particularly, said outer boundary structure is of a generally horizontal planar type material, such as vinyl, and extends about ground level continuously around said inner boundary. In the case where the garden plot is surrounded by grass, it is seen that said outer boundary would serve to support a portion of a lawn mower such that grass disposed about the outer edge thereof can be easily and cleanly cut.

3 Claims, 2 Drawing Figures

GARDEN EDGING STRUCTURE

FIELD OF INVENTION

The present invention relates to plant husbandry, and more particularly to garden edging structures for containing and confining a garden plot and separating the same from grass or other vegetation that might surround the garden plot.

BACKGROUND OF INVENTION

Garden edging structures have long been used to confine soil within garden plots having plants, flowers, and other forms of vegetation and plant life growing therein. Essentially such garden edging structures serve to identify the garden plot and to separate the same from adjacent grass, vegetation and soil. Further, such garden edging structures tend to confine and maintain soil within the garden plot, preventing the soil from washing away.

Heretobefore, garden edging structures have generally been custom built. Often individuals will use railroad ties or treated wood to build a border around the garden plot. Such an approach, however, is expensive, time consuming, and requires a great amount of labor and effort. In addition, where untreated wood is used for example, the life of the garden edging structure will be relatively short.

Typically garden plots are surrounded by grass. Another problem encountered with conventional garden edging structures is that of cutting grass extending directly adjacent the boundary structure surrounding the garden plot. Because of the presence of the garden edging structure itself, one cannot properly position a lawn mower that can appropriately be driven over the grass extending adjacent the garden plot boundary. Too often this grass is left uncut, leaving a less than neat appearance. To properly cut this grass, one would use small hand cutters, or, if available, a powered fling type cutter such as the "Weed Eater". Many people do not have access to such a fling type cutter and again cutting with small scissor type cutters is laborious and time consuming.

In view of the above, it is clear that there is a need for a readily available commercial type garden edging structure that can easily and conveniently be installed, is relatively inexpensive, which is easily adaptable to different sizes and shape plots, and which obviates the problem associated with cutting standing grass adjacent an elevated boundary portion of the garden edging structure.

SUMMARY AND OBJECTS OF THE PRESENT INVENTION

The present invention entails a modular type garden edging structure that is designed to be installed about a garden plot so as to confine soil within the plot and prevent the soil from washing therefrom, and which is further designed to separate the garden plot from the surrounding earth and vegetation growing therein.

In particular, the present invention includes an inner boundary structure that includes a lower portion that is driven into the ground and an upper portion that extends above the ground level and which generally surrounds the garden plot. Extending outwardly from the inner boundary structure is a generally planar, relatively thin strip material that is adapted to communicate with said inner boundary and extend a short distance outwardly therefrom. Outer boundary lies generally flat on the earth or soil surrounding the inner boundary and preferably includes some ornamental design about its upper surface. The presence of the outer boundary prohibits grass or other vegetation from growing in the area occupied by the same and because of its generally flat ground lying position and orientation, allows a lawn mower to move thereover so as to cut any grass or vegetation that would be growing immediately adjacent the outer terminal edge thereof.

It is, therefore, an object of the present invention to provide a garden edging structure that can be utilized in conjunction with all sizes and shapes of garden plots to identify the same and confine the soil within the inner bounds of the edging structure.

A more particular object of the present invention resides in the provision of a modular type garden edging structure that utilizes a series of connecting modules to give rise to a boundary structure that can be of any sze or shape depending on the orientation and number of boundary members used.

Still a further object of the present invention resides in the provision of a garden edging structure that is relatively simple to install, relatively inexpensive, and which is durable in construction and has a relatively long life.

It is also an object of the present invention to provide a garden edging structure of the character referred to above that is provided with a generally flat sheet-like outer boundary that defines a strip between the garden plot and outwardly disposed vegetation that allows a lawn mower to pass thereover such that grass standing directly adjacent the outer boundary can be neatly and cleanly cut.

It is also an object of the present invention to provide a garden edging structure that is in modular form but which after installation appears to be one integral unit.

Other objects and advantages of the present invention will become apparent from a study of the following description and the accompanying drawings which are merely illustrative of the present invention.

BRIEF DESCRIPTON OF DRAWINGS

GARDEN EDGING STRUCTURE

Figure 1:
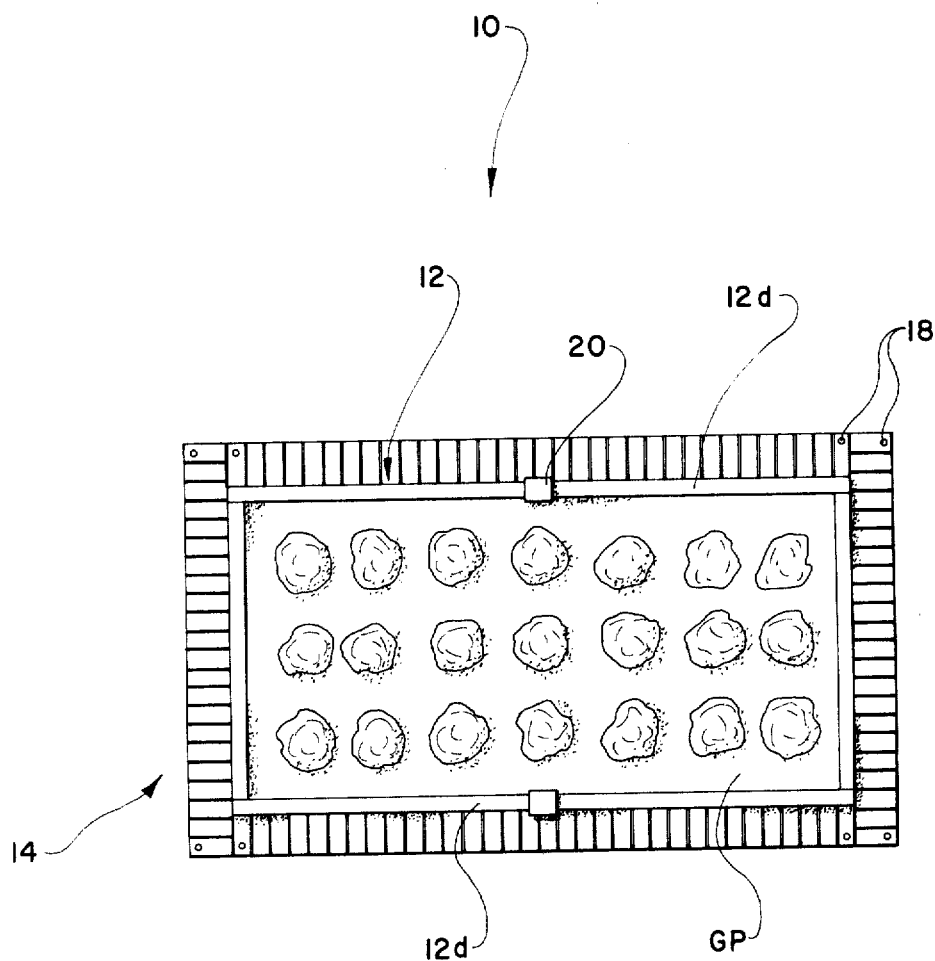
FIG. 1 is a top plan view of the garden edging structure enclosing a garden plot.
Figure 2:
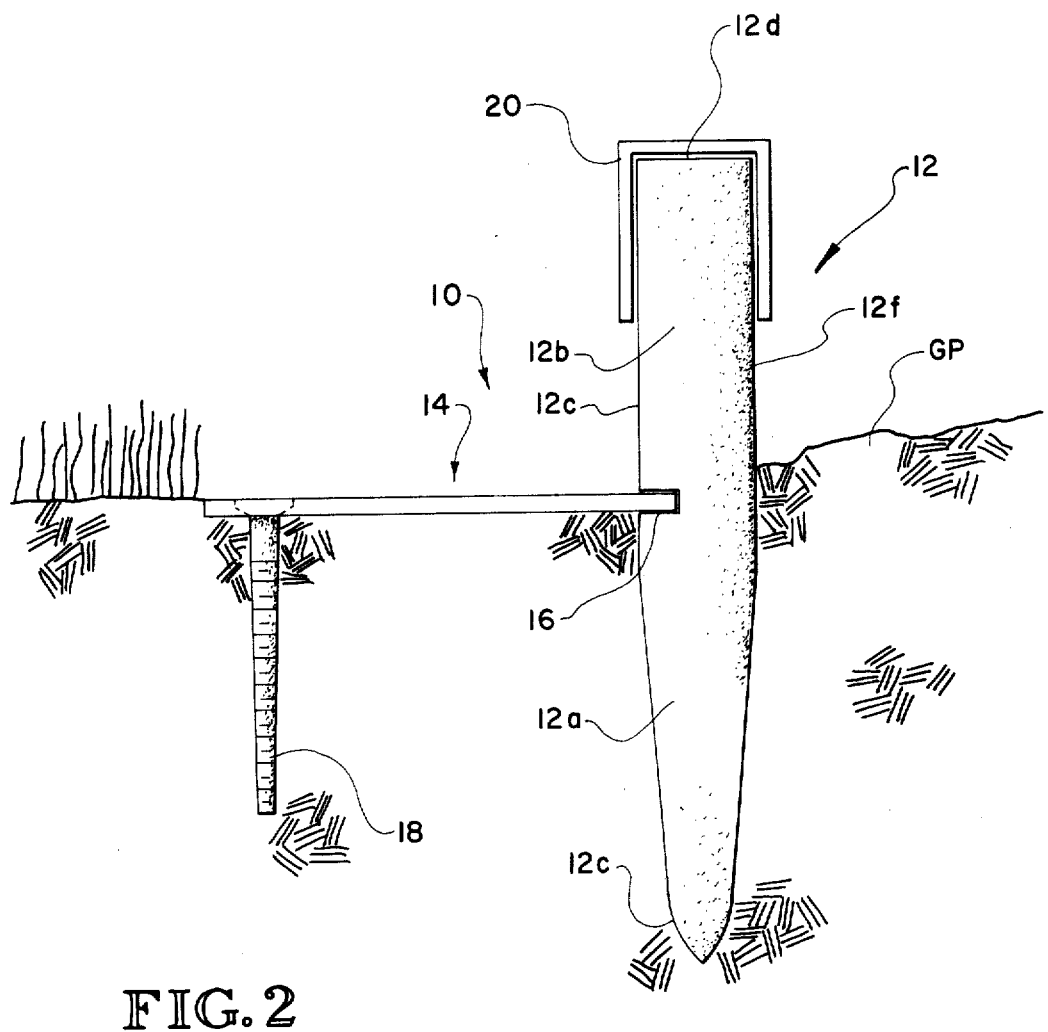
FIG. 2 is a transverse cross sectional view of the garden edging structure of the present invention.

With further reference to the drawings, the garden edging structure of the present invention is shown therein and indicated generally by the numeral 10.

Viewing garden edging structure 10 in more detail, it is seen that the same includes an inner boundary or border structure 12 that is adapted to surround a garden plot GP. The inner boundary structure 12 comprises a series of elongated boundary members or modules that are constructed in sections. For example, it is contemplated that an appropriate design would include inner boundary members or modules of four-foot sections. As will become apparent from subsequent portions of this disclosure, the respective sections are aligned and disposed end to end so as to extend around the garden plot GP.

As seen in the drawings, each inner boundary member includes a ground engaging portion 12a and an aboveground retaining portion 12b. The ground engaging portion 12a could be in the form of periodic extension extending downwardly from the aboveground retaining portion 12b. The alternative, it is appreciated that the ground engaging portion 12a could be continuous just as is the aboveground retaining portion 12b.

To facilitate the insertion of the inner boundary members into the soil, it is seen that the ground engaging portions 12a include a tapered lower end 12c. The aboveground retaining portions 12b on the other hand include a generally flat top portion 12d with downwardly extending sides 12f that in the present design extends generally normal to the plane of the earth.

Although the size and design of the inner boundary members 12 may vary to accommodate certain beds, it is contemplated that each inner boundary member 12 in a preferable design would be approximately fourteen inches in length with the aboveground portion being about six inches high and with the ground engaging portion being the remaining eight inches.

Disposed outwardly of said inner boundary structure 12 is an outer boundary or border 14. Outer boundary 14 comprises a relatively thin and planar strip material such as vinyl that is adapted to lie directly adjacent the earth, as illustrated in the drawings.

Outer boundary 14 would, as in the case of the inner boundary structure 12, be provided in modular lengths such as four-foot sections. Although various materials and designs could be provided for, it is contemplated that the outer boundary structure 14 would be of a vinyl brick-like edging design.

In order to communicatively join the inner boundary structure 12 with the outer boundary structure 14, an elongated slot 16 is provided about the outer side of the inner boundary module or member 12 at approximately ground level. Slots 16 receive the inner edge of the outer boundary 14.

To anchor the outer boundary 14 flatly against the underlying earth, there is provided a series of anchor screws 18, preferably of a plastic type material, which extend through the outer boundary vinyl brick-like edging 14 to anchor the outer boundary in place.

As discussed hereinabove, the garden edging structure 10 of the present invention is preferably provided in modular sections and accordingly can be built to any size and oriented to conform to different shapes. There are provided a series of U-shaped caps 20 that are designed to fit over respective joining portions of successive inner boundary modules or members 12. In essence the U-shaped caps tend to hide the joining seam and give a continuous appearance such that the entire inner boundary structure 12 appears to look like a two by four wood edging structure, although the same would preferably be constructed of a plastic-like material.

As seen in the drawings, the inner boundary structure confines soil within the garden plot GP. The outer boundary material 14 prohibits grass from growing in the covered adjacent area surrounding the garden plot and the inner boundary 12. Outer boundary 14 further allows a lawn mower to move thereover to cut the immediate edge of grass growing along the outer terminal edge of the outer boundary 14.

From the foregoing, it is appreciated that the present invention presents a garden edging structure that does in fact confine soil within a garden plot and further allows grass to be cleanly cut by a lawn mower around the entire garden plot GP. In addition, the garden edging structure 10 of the present invention can be constructed of plastic material so as to avoid deteriorations such as is common with wood. Further, the modular nature of the structure gives it great versatility for accommodating many different size and shape plots.

The terms "upper", "lower", "forward", "rearward", etc., have been used herein merely for the convenience of the foregoing specification and in the appended claims to describe the garden edging structure and its parts as oriented in the drawings. It is to be understood, however, that these terms are in no way limiting to the invention since the garden edging structure may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A garden edging structure for generally surrounding an enclosing a garden plot comprising: an inner closed border structure for enclosing and extending around a garden plot; said inner border structure including a series of ground penetrating border member having a first underground portion that is adapted to extend into the ground and to generally anchor said inner border structure about said garden plot and a second portion extending above ground level and generally surrounding said garden plot, said inner border structure further including a series of elongated ground penetrating members of selected length, and wherein there is provided a U-shaped connecting means adapted to be capped in inverted fashion over and about respective joints defined between successive ground penetrating members comprising said inner boundary structure; and wherein said ground penetrating members of said inner border structure in transverse cross section comprises an elongated member extending into the ground with a lower tapered ground penetrating end and a generally rectangularly shaped upper portion with a flat top exposed surface extending above ground level; a generally planar horizontally extending outer border structure disposed outwardly and adjacent said inner border structure and extending generally around said garden plot outwardly of said inner border structure, said outer border structure including an elongated, relatively thin strip of material comprising a segment of vinyl material with an ornamental surface provided about the top thereof; joining means for allowing said outer border structure to join said inner border structure to form a continuous border around said garden plot, said joining means including a slot formed along the outer side of said inner border structure with said slot having a depth at least equal to the thickness of said outer border strip material for receiving the same, and wherein said slot is formed intermediately along the height of said inner border structure such that said slot lies generally at ground level; and anchoring means engaged with said outer border structure for penetrating into the earth surrounding said garden plot to anchor said outer border structure about said garden plot.

2. The edging structure of claim 1 wherein said anchoring means includes a plurality of rigid screw members adapted to extend through said outer border structure and to engage the underlying earth so as to secure said outer border structure over the underlying earth.

3. The edging structure of claim 2 wherein said ground engaging members of said inner border structure in transverse cross section comprises an elongated member extending into the ground with a tapered ground penetrating end and a generally flat top exposed surface extending aboveground level.

* * * * *